United States Patent
Celik (10) Patent No.: US 10,259,179 B2
(45) Date of Patent: Apr. 16, 2019

(54) METHOD OF PRODUCING A NON-PNEUMATIC SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 280 days.

(21) Appl. No.: 15/351,727

(22) Filed: Nov. 15, 2016

(65) Prior Publication Data

US 2018/0133993 A1    May 17, 2018

(51) Int. Cl.
| | |
|---|---|
| *B29D 30/02* | (2006.01) |
| *B29D 30/00* | (2006.01) |
| *B29D 30/26* | (2006.01) |
| *B29D 30/30* | (2006.01) |
| *B29K 21/00* | (2006.01) |

(52) U.S. Cl.
CPC ......... *B29D 30/02* (2013.01); *B29D 30/0061* (2013.01); *B29D 30/26* (2013.01); *B29D 30/2607* (2013.01); *B29D 30/3014* (2013.01); *B29K 2021/00* (2013.01); *Y10T 29/49494* (2015.01)

(58) Field of Classification Search
CPC ................ B29D 30/02; B29D 30/3014; B29D 30/2607; B29D 30/0061; B29D 30/26; B29K 2021/00; Y10T 29/49481; Y10T 29/49492–29/49504; Y10T 29/49524–29/49529
See application file for complete search history.

(56) References Cited

U.S. PATENT DOCUMENTS

| | | | |
|---|---|---|---|
| 479,255 | A | 7/1892 | Dunlop |
| 482,175 | A | 9/1892 | Hollafolla |
| 1,002,003 | A | 8/1911 | Simonson |

(Continued)

FOREIGN PATENT DOCUMENTS

| | | |
|---|---|---|
| EP | 1902866 A1 | 3/2008 |
| EP | 2527132 A1 | 11/2012 |

(Continued)

OTHER PUBLICATIONS

European Search Report dated Mar. 9, 2018 for Application Serial No. EP17199945.

*Primary Examiner* — Sarang Afzali
(74) *Attorney, Agent, or Firm* — Robert N. Lipcsik (57) ABSTRACT

A method manufactures a wheel and tire assembly for a vehicle by extruding a sprocket from a first polymer; sliding the sprocket over a drum; forming a layer by wrapping a ply around inflatable bladders; transferring the ply and bladders to the sprocket; positioning the bladders and ply to correspond to curved indentations of the sprocket; inflating the bladders to tension to position the ply; extruding a ring from a second polymer; sliding the ring over the drum; positioning the bladders and ply to correspond to curved indentations of the ring; forming cylindrical cavities by the curved indentations of the sprocket and ring; securing a layer about an outer surface of the ring; deflating the bladders; contracting the drum; removing the bladders and drum from a complete structure including the sprocket, ply, ring and the layer; curing the complete structure; and mounting the complete, cured structure on a vehicle wheel.

10 Claims, 7 Drawing Sheets

(56) References Cited

U.S. PATENT DOCUMENTS

| | | | |
|---|---|---|---|
| 1,233,722 | A | 7/1917 | Smith |
| 1,389,285 | A | 8/1921 | Althoff |
| 1,451,517 | A | 4/1923 | Smith |
| 1,930,764 | A | 10/1933 | Mallory |
| 3,493,027 | A | 2/1970 | Dewhirst |
| 4,226,273 | A | 10/1980 | Long |
| 4,235,270 | A | 11/1980 | Kahaner |
| 4,602,823 | A | 7/1986 | Berg |
| 5,343,916 | A | 9/1994 | Duddey |
| 5,800,643 | A | 9/1998 | Frankowski |
| 6,068,721 | A | 5/2000 | Dyer |
| 6,260,598 | B1 | 7/2001 | Tanaka |
| 8,888,939 | B2 | 11/2014 | Bormann |
| 8,962,120 | B2 | 2/2015 | Delfino |
| 2004/0069385 | A1 | 4/2004 | Timoney |
| 2008/0073014 | A1 | 3/2008 | Abe |
| 2010/0193097 | A1 | 8/2010 | McNier |
| 2012/0205017 | A1 | 8/2012 | Endicott |
| 2012/0318458 | A1 | 12/2012 | Araki |
| 2014/0083581 | A1 | 3/2014 | Schaedler |
| 2014/0116601 | A1 | 5/2014 | Bormann |
| 2016/0016426 | A1 | 1/2016 | Endicott |

FOREIGN PATENT DOCUMENTS

| | | |
|---|---|---|
| EP | 2727713 A1 | 5/2014 |
| SU | 619352 A1 | 8/1978 |
| WO | 2011025491 A1 | 3/2011 |
| WO | 2016178970 A1 | 11/2016 |

METHOD OF PRODUCING A NON-PNEUMATIC SUPPORT STRUCTURE

FIELD OF INVENTION

The present invention relates to wheel/tire assemblies, and more particularly, to a method of producing a non-pneumatic wheel/tire assembly.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A first method in accordance with the present invention manufactures a wheel and tire assembly for a mobile vehicle. The first method includes the steps of: extruding a cylindrical sprocket structure out of a first polymer; sliding the structure over a cylindrical tire building drum; forming an annular reinforcement layer by wrapping a ply around inflatable bladders; transferring the reinforcement layer and bladders to a sprocket structure; positioning the bladders and ply to correspond to curved indentations of the sprocket structure; inflating the bladders to tension and appropriately position the ply; extruding a cylindrical ring structure out of a second polymer; sliding the ring structure over the tire building drum; positioning the bladders and ply to correspond to curved indentations of the ring structure; forming cylindrical cavities by the curved indentations of the sprocket structure and ring structure; securing an annular layer about an outer surface of the ring structure; deflating the bladders; contracting the tire building drum; removing the bladders and tire build drum from a complete structure including the sprocket structure, the ply, the ring structure, and the layer; curing the complete structure; and mounting the complete, cured structure on a vehicle wheel.

According to another aspect of the first method, the first polymer and the second polymer are the same material.

According to still another aspect of the first method, the first polymer is a homogenous rubber.

According to yet another aspect of the first method, the second polymer is a homogenous rubber.

According to still another aspect of the first method, the first polymer is uniform, homogenous rubber.

According to yet another aspect of the first method, the second polymer is a uniform, homogenous rubber.

According to still another aspect of the first method, another step constructs the sprocket structure from a plurality of wedge profiles.

According to yet another aspect of the first method, another step assembles the ring structure from a plurality of wedge profiles.

According to still another aspect of the first method, another step wraps the ply alternately inside a bladder and outside an adjacent bladder.

According to yet another aspect of the first method, another step of wraps the ply alternately outside a bladder and inside an adjacent bladder.

A second method in accordance with the present invention manufactures a wheel and tire assembly for a mobile vehicle. The second method includes the steps of: extruding a cylindrical sprocket structure out of a first polymer; sliding the structure over a cylindrical tire building drum; forming an annular reinforcement layer by wrapping a ply alternately around an inside surface of an inflatable bladder and an outside surface an adjacent inflatable bladder; transferring the reinforcement layer and bladders to a sprocket structure; positioning the bladders and ply to correspond to curved indentations of the sprocket structure; inflating the bladders to tension and appropriately position the ply; extruding a cylindrical ring structure out of a second polymer; sliding the ring structure over the tire building drum; positioning the bladders and ply to correspond to curved indentations of the ring structure; forming cylindrical cavities by the curved indentations of the sprocket structure and ring structure; securing an annular layer about an outer surface of the ring structure; deflating the bladders; contracting the tire building drum; removing the bladders and tire build drum from a complete structure including the sprocket structure, the ply, the ring structure, and the layer; curing the complete structure; and mounting the complete, cured structure on a vehicle wheel.

According to another aspect of the second method, the first polymer and the second polymer are the same material.

According to still another aspect of the second method, the first polymer is a homogenous rubber.

According to yet another aspect of the second method, the second polymer is a homogenous rubber.

According to still another aspect of the second method, the first polymer is uniform, homogenous rubber.

According to yet another aspect of the second method, the second polymer is a uniform, homogenous rubber.

According to still another aspect of the second method, another step constructs the sprocket structure from a plurality of wedge profiles.

According to yet another aspect of the second method, another step assembles the ring structure from a plurality of wedge profiles.

According to still another aspect of the second method, another step wraps the ply alternately inside a bladder and outside an adjacent bladder.

According to yet another aspect of the second method, another step wraps the ply alternately outside a bladder and inside an adjacent bladder.

A third method in accordance with the present invention manufactures a wheel and tire assembly for a mobile vehicle. The first method includes the steps of: extruding a single piece cylindrical structure out of a polymer; removing polymer from the cylindrical structure to create a plurality of cylindrical cavities in the structure disposed concentrically about an axis of rotation of the cylindrical structure; mounting the cylindrical structure on to a central hub; and mounting an annular flexible rim on to the cylindrical structure.

According to another aspect of the third method, the extruding step and the removing step occur simultaneously.

According to still another aspect of the third method, the polymer has a uniform structure.

According to yet another aspect of the third method, the polymer has a homogenous structure.

According to still another aspect of the third method, each cylindrical cavity of the plurality of cylindrical cavities has a common diameter.

According to yet another aspect of the third method, each cylindrical cavity of the plurality of cylindrical cavities has a common length equal to a uniform axial thickness of the cylindrical structure.

A system manufactures a wheel and tire assembly for a mobile vehicle. The system includes a single piece cylindrical structure extruded from a polymer, a plurality of cylindrical cavities in the cylindrical structure disposed concentrically about an axis of rotation of the cylindrical structure, the cylindrical cavities being formed by removing polymer from the cylindrical structure, a central hub secured to a radially inner surface of the cylindrical structure, and an annular flexible rim secured to a radially outer surface of the cylindrical structure.

According to another aspect of the system, the one piece cylindrical structure and cylindrical cavities are formed simultaneously.

According to still another aspect of the system, the polymer has a uniform structure.

According to yet another aspect of the system, the polymer has a homogenous structure.

According to still another aspect of the system, each cylindrical cavity of the plurality of cylindrical cavities has a common diameter.

According to yet another aspect of the system, each cylindrical cavity of the plurality of cylindrical cavities has a common length equal to a uniform axial thickness of the cylindrical structure.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional wheel, such as that described in US 2004/0069385 incorporated herein by reference in its entirety, may have an outer rim flexibly connected to a central hub by means of lightweight composite springs. The springs may be plates fixed to the rim and to the hub. The hub may contain a speed reduction gear unit and/or an electric motor and may have a suspension mechanism for connecting a vehicle chassis to each wheel. The rim may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material.

Another conventional wheel may have a rubber strip with a molded tread bonded to a composite rim for improved grip. Further, the springs interconnecting the rim and hub may be S-shaped lightweight composite springs.

Still another conventional wheel may have a rim connected to a hub by means of a plurality of S-shaped springs. Each spring may have an inner end attached to the hub and an outer end attached to the rim. A different construction of rubber strip with molded tread may extend about an exterior of the rim.

Yet another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps. The assembly may further have a limit stop disc mounted on the central hub, coaxial with the central hub, and disposed radially outward from the central hub. An outer peripheral edge of the stop disc may be disposed spaced-apart and radially inward from an inner face of the circular rim for engagement with the circular rim upon radially inward flexing of the circular rim by a preset distance.

Another example wheel/tire assembly may be formed from a lightweight polymer material, such as, for example, a standard tire rubber compound or other polymer. The assembly may have a cylindrical central hub, such as an automobile wheel, and a circular outer flexible rim, which may include a shear band and tread structure, mounted on the central hub by a toroidal, or doughnut-shaped, configuration or structure comprising the rubber compound extending between the central hub and the flexible rim.

The toroidal configuration may further include cylindrical cavities disposed concentrically about the central hub allowing the configuration to deflect under load thereby defining a suitable balance between flexibility for ride comfort and traction within a footprint of the assembly and stiffness for vehicle handling, low rolling resistance, and low heat build-up of the configuration. The cylindrical cavities may further reduce assembly weight while the cylindrical shape of the cavities may maintain essentially homogenous and uniform pressure distribution within the rubber compound. The dimensions and number of the cylindrical cavities may be varied or made uniform for further tuning of the flexibility/stiffness of the assembly.

Still another example wheel/tire assembly may be formed from a lightweight polymer material, such as, for example, a standard tire rubber compound or other polymer. The assembly may have a cylindrical central hub and a circular outer flexible rim mounted on the central hub by a toroidal configuration or structure comprising the rubber compound extending between the central hub and the circular rim.

The toroidal configuration may further include cylindrical cavities disposed concentrically about the central hub allowing the configuration to deflect under load thereby defining a suitable balance between flexibility for ride comfort and traction within a footprint of the assembly and stiffness for vehicle handling, low rolling resistance, and low heat build-up of the configuration. The cylindrical cavities may further reduce assembly weight while the cylindrical shape of the cavities may maintain essentially homogenous and uniform pressure distribution within the rubber compound. The dimensions and number of the cylindrical cavities may be varied or made uniform for further tuning of the flexibility/stiffness of the assembly.

Yet another example wheel/tire assembly may be formed of a polymer material, such as, for example, a standard tire rubber compound or other polymer. The assembly may have a cylindrical central hub and a circular outer flexible rim mounted on the central hub by a toroidal configuration or structure comprising the rubber compound extending between the central hub and the circular rim.

The assembly may further include one or two reinforcing membranes interlaced circumferentially and radially about the cylindrical cavities for further tuning the flexibility/stiffness of the assembly. The membrane may be constructed of a metal, polymer, composite, and/or other suitable material for further refining the operating parameters of the assembly. The dimensions and number of layers of the membrane may be varied or made uniform for further tuning of the flexibility/stiffness of the assembly. The assembly may further include radially extending flexible shafts for further tuning the flexibility/stiffness of the assembly. The shafts may be constructed of a metal, polymer, composite, and/or other suitable material and may be designed to buckle at a predetermined load for further refining the operating parameters of the assembly.

Figure 1:
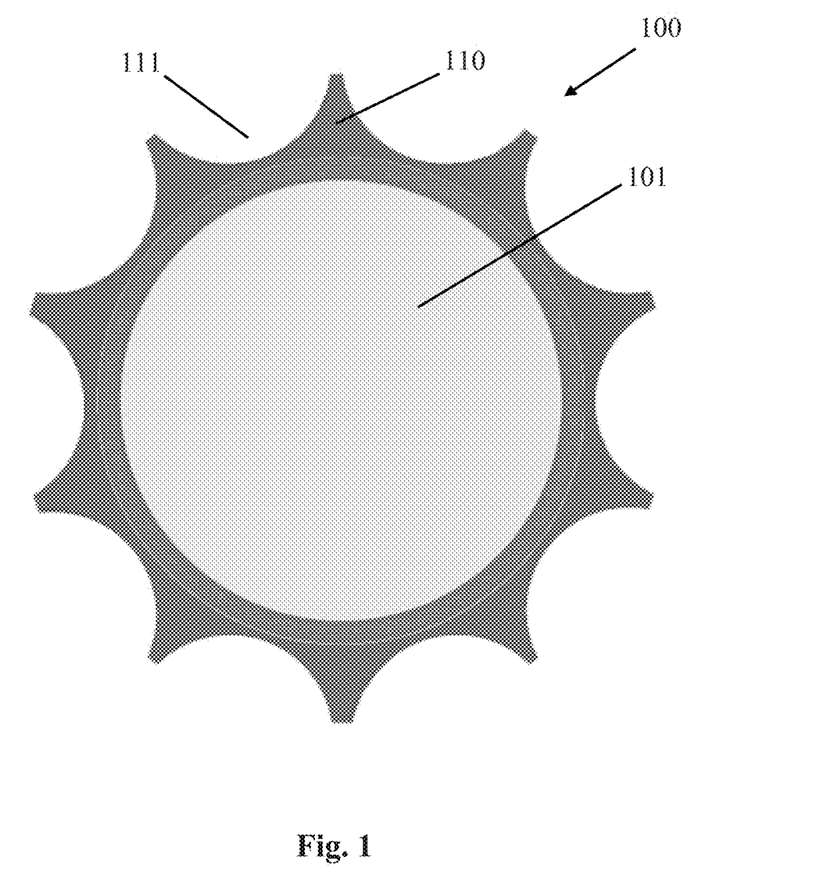
FIG. 1 is a schematic view of part of an example manufacturing method in accordance with the present invention.
Figure 2:
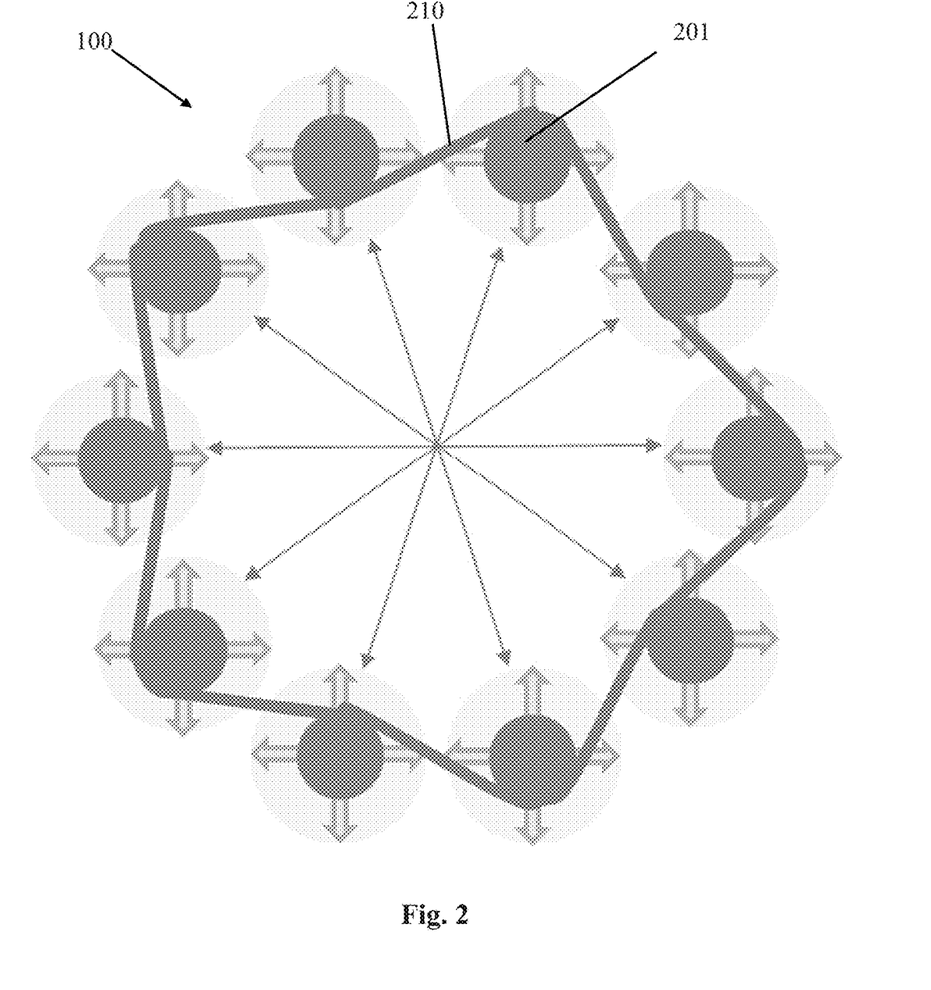
FIG. 2 is a schematic view of another part of an example manufacturing method in accordance with the present invention.
Figure 8:
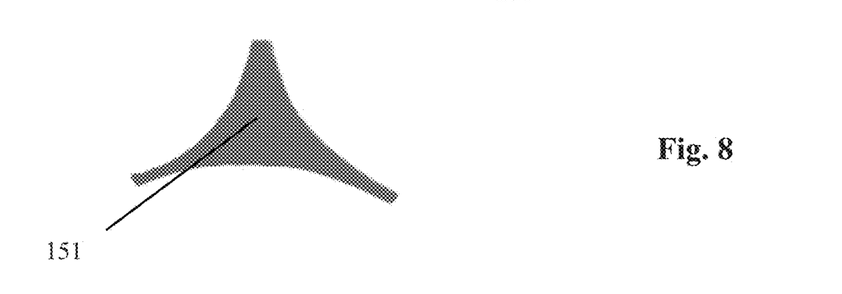
FIG. 8 is a schematic view of another example part for use with the example manufacturing method of the present invention.

A method 100 of manufacturing a wheel and tire assembly for a mobile vehicle (FIGS. 1-6) in accordance with the present invention may include extruding a single piece cylindrical sprocket structure 110 out of a uniform, homogenous polymer and sliding the structure over a cylindrical tire building drum 101. Alternatively, the cylindrical structure 110 may be formed of a plurality of wedge profiles 151 (FIG. 8) secured to each other to create the sprocket structure 110 of FIG. 1.

Figure 3:
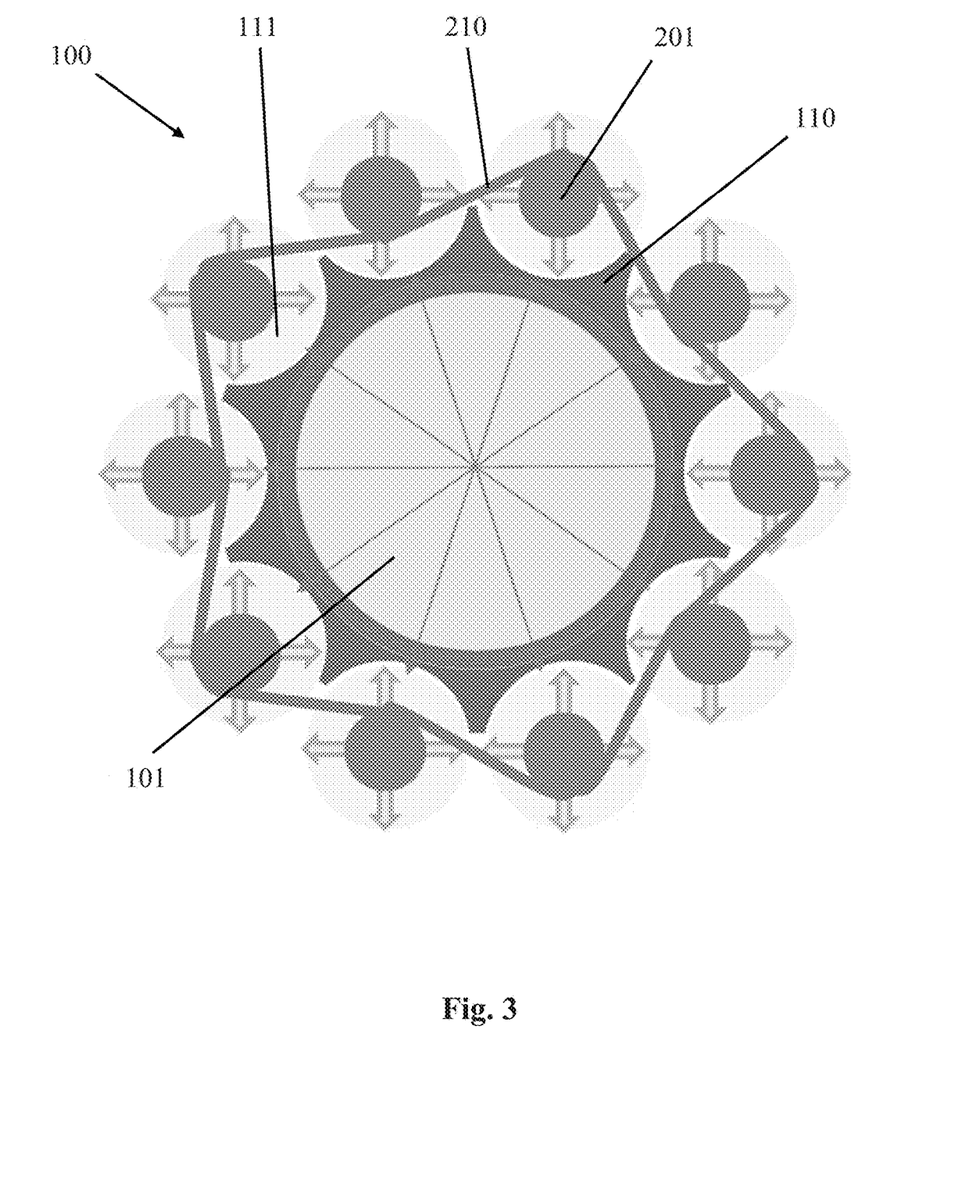
FIG. 3 is a schematic view of still another part of an example manufacturing method in accordance with the present invention.
Figure 4:
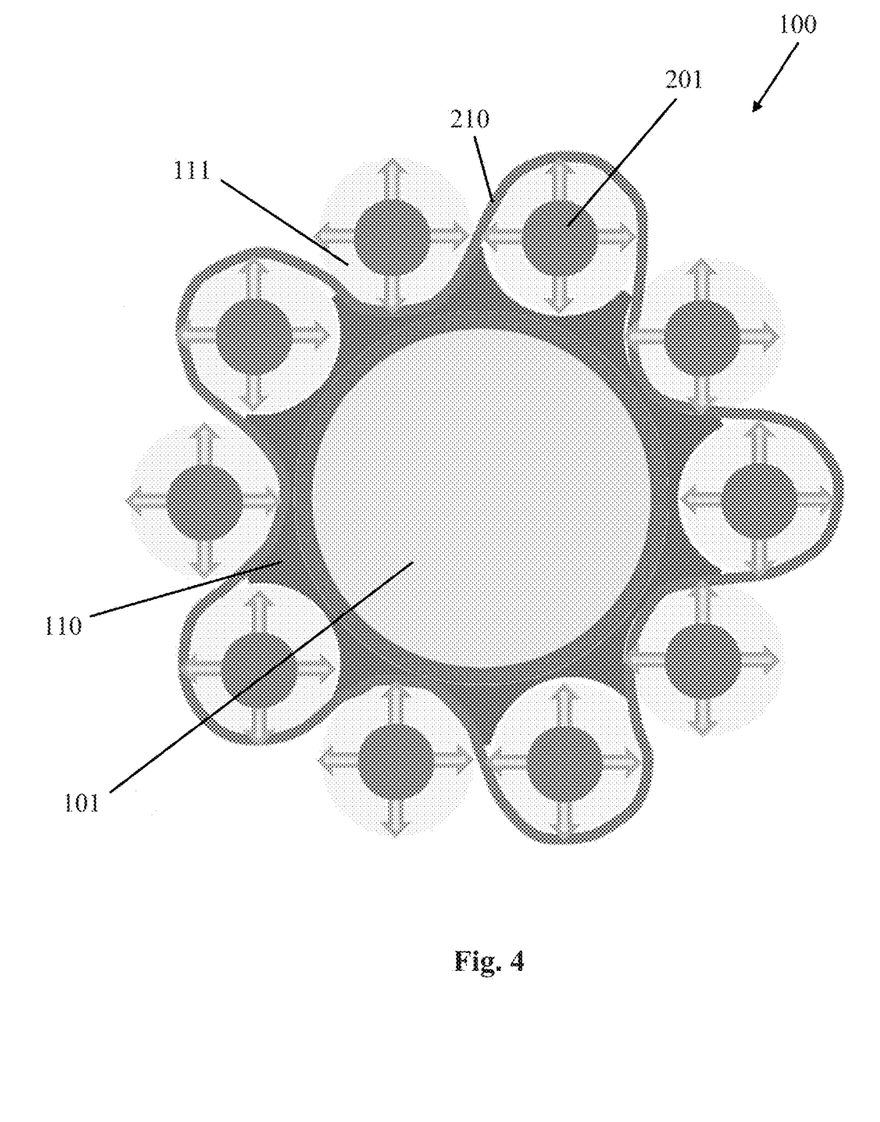
FIG. 4 is a schematic view of yet another part of an example manufacturing method in accordance with the present invention.
Figure 5:
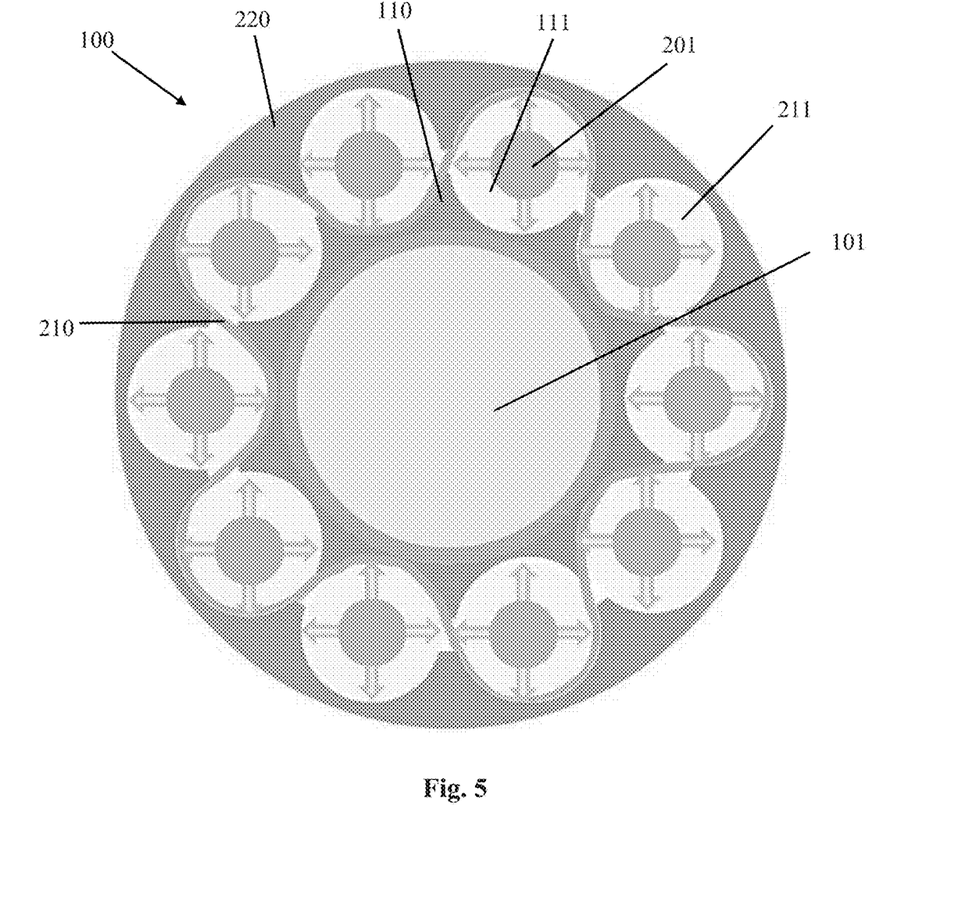
FIG. 5 is a schematic view of still another part of an example manufacturing method in accordance with the present invention.
Figure 6:
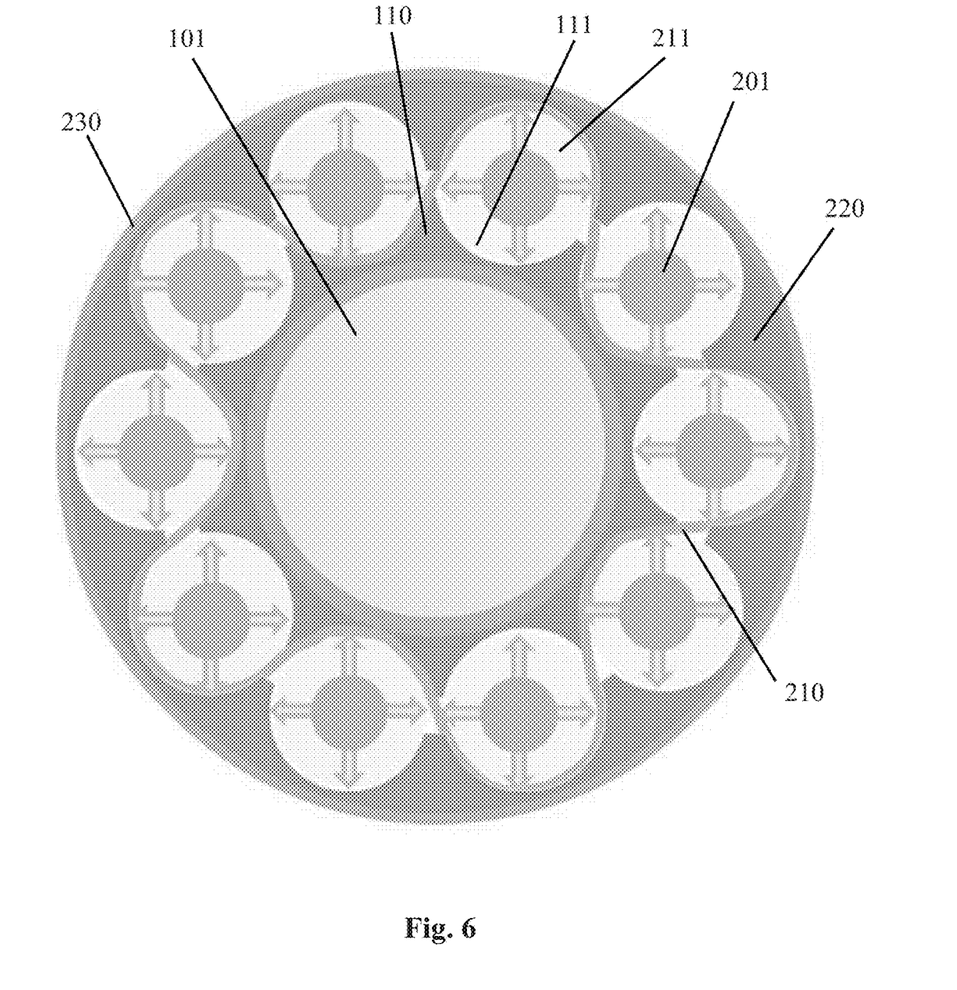
FIG. 6 is a schematic view of yet another part of an example manufacturing method in accordance with the present invention.

The method 100 may further include the step (FIG. 2) of forming a reinforcement by wrapping a ply 210 around inflatable rubber bladders 201 and transferring the reinforcement and bladders to the sprocket structure 110 (FIG. 3). The method 100 may further include the step (FIG. 4) of positioning the bladders 201 and ply 210 to correspond to curved indentations 111 of the sprocket structure 110 and inflating the bladders to tension and appropriately position the ply.

Figure 7:
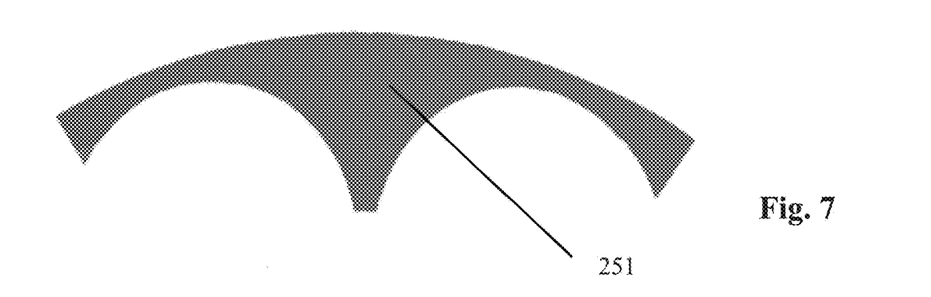
FIG. 7 is a schematic view of an example part for use with the example manufacturing method of the present invention.

The method 100 may further include the step (FIG. 5) of extruding a single piece cylindrical ring structure 220 out of a uniform, homogenous polymer and sliding the structure over the drum 101, sprocket structure 110, bladders 201, and ply 210. Alternatively, the cylindrical ring structure 220 may be formed of a plurality of wedge profiles 251 (FIG. 7) secured to each other to create the ring structure 220 of FIG. 5. The method 100 may further include the step (FIG. 5) of positioning the bladders 201 and ply 210 to correspond to curved indentations 211 of the ring structure 220 to form cylindrical cavities 111, 211 by the inflated bladders 201. The method 100 may further include the step (FIG. 6) of positioning and securing a layer 230 about the outer surface of the ring structure 220. The layer 230 may include a shear band structure and a tread structure. The drum 101 and bladders 201 may then be deflated/contracted and axially removed from the entire structure, which now includes the sprocket structure 110, the ply 210, the ring structure 220, and the layer 230. The entire structure may then be cured and made ready to mount onto a rim vehicle.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A method of manufacturing a wheel and tire assembly for a mobile vehicle comprising the steps of:
    extruding a cylindrical sprocket structure from a first polymer;
    sliding the sprocket structure over and around a cylindrical tire building drum;
    forming an annular reinforcement layer by wrapping a ply around a plurality of inflatable bladders;
    transferring the bladders and ply to the sprocket structure;
    positioning the bladders and ply around the sprocket structure to correspond to curved indentations of the sprocket structure;
    inflating the bladders to tension and appropriately position the ply;
    extruding a cylindrical ring structure from a second polymer;
    sliding the ring structure over and around the bladders and ply positioned over the sprocket structure and the tire building drum;
    positioning the bladders and ply to correspond to curved indentations of the ring structure;
    forming cylindrical cavities by the curved indentations of the sprocket structure and the ring structure;
    securing an annular layer about an outer surface of the ring structure;
    deflating the bladders;
    contracting the tire building drum;
    removing the bladders and tire build drum from a complete structure including the sprocket structure, the ply, the ring structure, and the layer;
    curing the complete structure; and
    mounting the complete, cured structure on a vehicle wheel.

2. The method as set forth in claim 1 wherein the first polymer and the second polymer are the same material.

3. The method as set forth in claim 1 wherein the first polymer is a homogenous rubber.

4. The method as set forth in claim 1 wherein the second polymer is a homogenous rubber.

5. The method as set forth in claim 1 wherein the first polymer is uniform, homogenous rubber.

6. The method as set forth in claim 1 wherein the second polymer is a uniform, homogenous rubber.

7. The method as set forth in claim 1 wherein the sprocket structure is formed from a plurality of wedge profiles.

8. The method as set forth in claim 1 wherein the ring structure is formed from a plurality of wedge profiles.

9. The method as set forth in claim 1 wherein the wrapping further includes wrapping the ply alternately inside a bladder and outside an adjacent bladder of the plurality of bladders.

10. The method as set forth in claim 1 wherein the wrapping further includes wrapping the ply alternately outside a bladder and inside an adjacent bladder of the plurality of bladders.

\* \* \* \* \*